United States Patent [19]
Sugimoto et al.

[11] 3,812,731
[45] May 28, 1974

[54] V-BELT TYPE AUTOMATIC SPEED CHANGE GEAR

[75] Inventors: Takao Sugimoto; Izumi Takagi, both of Akashi, Japan

[73] Assignee: Kawasaki Jukogyo Kabushiki Kaisha, Kobe City, Japan

[22] Filed: Jan. 16, 1973

[21] Appl. No.: 324,182

[30] Foreign Application Priority Data
May 27, 1972    Japan................................ 47-52645

[52] U.S. Cl............................................ 74/230.17 E
[51] Int. Cl............................................ F16h 55/52
[58] Field of Search......... 74/230.17 E; 192/105 CP

[56] References Cited
UNITED STATES PATENTS

| | | | |
|---|---|---|---|
| 1,438,614 | 12/1922 | Settlage | 192/105 CP |
| 1,695,355 | 12/1928 | Wheeler | 192/105 CP |
| 1,722,546 | 7/1929 | Wheeler | 192/105 CP |
| 2,117,494 | 5/1938 | Neighbour | 192/105 CP |
| 2,696,898 | 12/1954 | Kuehn | 192/105 CP |
| 2,859,847 | 11/1958 | Kuehn | 192/105 CP |
| 3,230,787 | 1/1966 | Siegel | 74/230.17 E |
| 3,459,061 | 8/1969 | Barnish | 74/230.17 E |
| 3,597,987 | 8/1971 | Keekhaefer | 74/230.17 E |
| 3,605,510 | 9/1971 | Laughlen | 74/230.17 E |
| 3,648,532 | 3/1972 | Vallures | 74/230.17 E |

FOREIGN PATENTS OR APPLICATIONS
564,927    11/1932    Germany......................... 192/105 C

*Primary Examiner*—Manuel A. Antonakas
*Assistant Examiner*—R. H. Lazarus
*Attorney, Agent, or Firm*—Milford A. Juten

[57] ABSTRACT

An automatic speed change V-Belt drive pulley having a fixed conical flange and a movable cooperating conical flange for engaging the edges of a V-Belt with a drive disc fixed to the same shaft carrying the fixed conical flange and cooperating cam means and centrifugally outwardly movable weights operating cam followers which engage the cam surface on one of the movable flange and the fixed disc so that when the centrifugal weight moves outwardly due to increased speed the movable flange moves toward the fixed flange thereby causing the V-belt to move outwardly along the surfaces of the belt engaging conical surfaces of the fixed and movable flanges, the centrifugal weights being mounted on pivoted arms pivoted about axes parallel with the shaft on which the speed change device is mounted.

9 Claims, 7 Drawing Figures

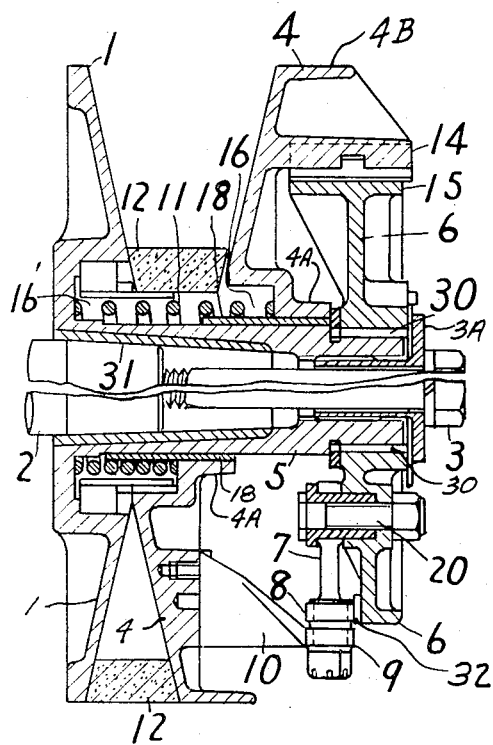
Fig. 1
Fig 1A.
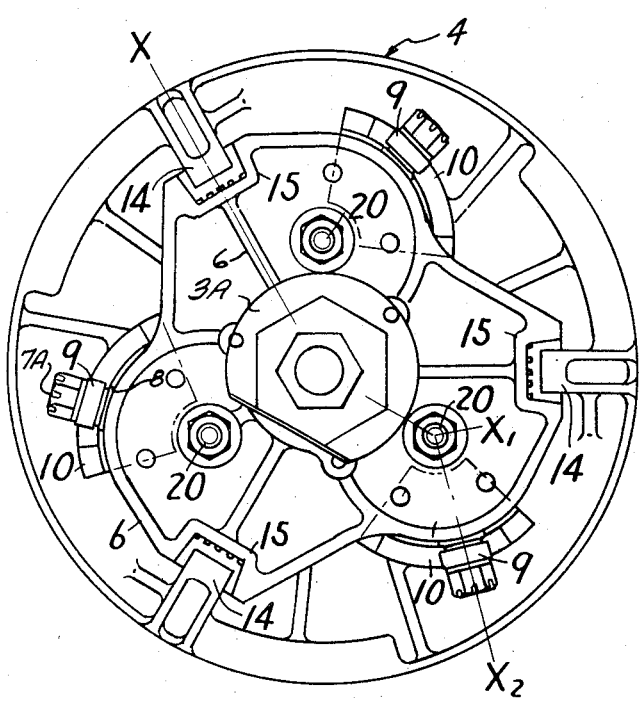
Fig. 2

PATENTED MAY 28 1974

V-BELT TYPE AUTOMATIC SPEED CHANGE GEAR

The invention relates to V-belt speed change clutch mechanisms which automatically perform a clutching operation as well as a speed changing operation in accordance with the speed of rotation of the drive shaft and is particularly useful for driving snowmobiles, scooters and the like and is an improvement over the structure shown in FIG. 6 of U.S. Pat. 3,266,330 where the centrifugal weights are mounted on arms pivoted on axes transverse to the axis of rotation of the pulley.

An object of the present invention is to reduce the axial length of the pulley structure of the prior art and provide a balanced variable speed change V-shaped pulley which can be applied to the existing machines with a minimum of expense.

Other and further objects will be apparent upon reference to the drawings wherein:

FIG. 1 is a quarter section taken on line X-O of FIG. 2 showing the pulley in idling or stopped position.

FIG. 1A is a quarter section taken on broken line O-X'-X² of FIG. 2 showing the pulley in its highest speed position with the flanges close together and the belt at the outer periphery and showing the centrifugal weights in their outermost position.

FIG. 2 is a left end elevation of the pulley.

Figure 3:
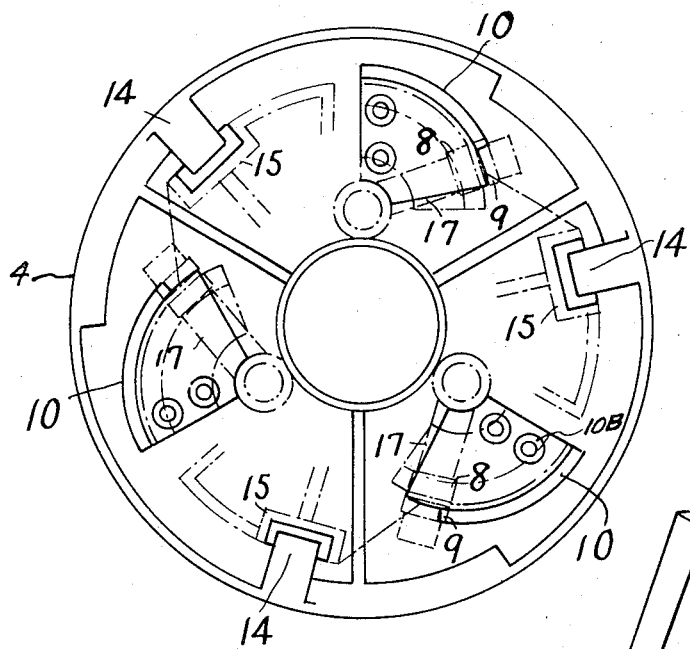

FIG. 3 is a right end elevation of the belt engaging axially movable flange showing the cams thereon and also showing in phantom outline the centrifugal weights and their support arms and portions of the fixed drive disc with the cooperating grooves cooperating with the engaging tongues or cam means of the movable flange to provide for driving relation between the movable flange and the drive disc.

Figure 4:
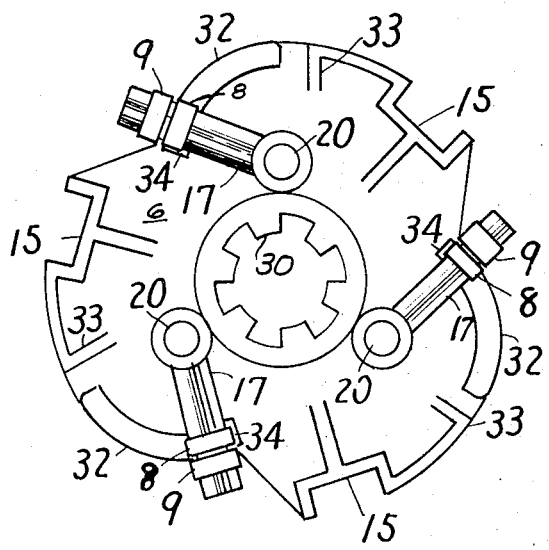

FIG. 4 is a left end elevation of the drive disc showing the centrifugal weight supporting arms pivoted on their axes parallel with the axis of rotation of the pulley.

Figure 5:
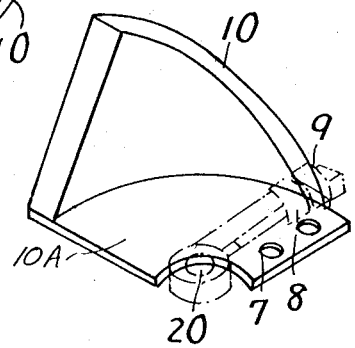
Figure 6:
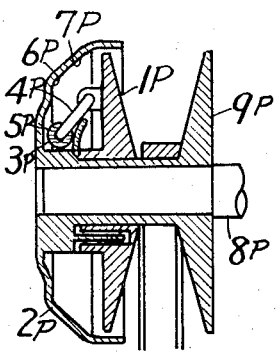

FIG. 5 is a pictorial view of the cam and its supporting plate with the centrifugal weight supporting arm shown in phantom lines. FIG. 6 shows the prior art corresponding to U.S. Pat. No. 3,266,330.

The prior art showing in FIG. 6 shows a fixed flange 9P fixed to a driving disc 2P with the driving disc having inner cam surfaces 5P-6P and axially movable conical flange 1P with a belt positioned between the conical surfaces of the fixed flange 9P and movable flange 1P. A cam follower 3P is carried by a pivoted arm 4P pivoted on a transverse axes on the movable flange 1P. Upon rotation of the shaft 8P the centrifugal weight follower 3P causes the arm 4P to move outwardly so that the cam follower 3P moves along surfaces 5P, 6P and 7P causing the movable flange 1P to be moved toward the fixed flange 9P thereby causing the belt to move outwardly as the conical surfaces of flanges move together thereby acting as a clutch and a speed control in the well known manner.

The present invention shows a drive shaft 2 having a tapered portion receiving a tapered sleeve 31 which is received in the tapered bore of a tubular shaft 5 which is secured to drive shaft 2 with the threaded bolt 3 which engages a conventional locknut and a spacer 3A providing a radially extending washer and also providing inwardly extending spacing elements to accurately position the bore of the tubular shaft 5 with respect to the bolt 3. Fixed to and part of the shaft 5 is the fixed flange 1 having a conical belt engaging surface for engaging the belt 12. A movable flange 4 having a conical belt engaging surface for engaging the V-belt 12 is axially slidable on a bushing 18 rotatably supporting the hub of the movable flange 4 so that the movable flange 4 may be moved axially, the flange 4 having a recess 16 within its hub portion and the flange 1 having a recess 16' within its hub portion for receiving a coil compression spring 17 which urges the movable flange to its inoperative position shown in FIG. 1 whereby the belt 12 is not driven.

The flange 4 has inwardly tongue or lug means 14 at three balanced locations and such lug means cooperate with corresponding grooves 15 on the outer periphery of a drive disc 6 which drive disc is provided with a hub having a spline 30 extending inwardly from the bore thereof cooperating with outwardly extending splines on tubular shaft 5 whereby the disc 6 rotates in synchronism with the fixed flange 1.

Cam means 10 of triangular shape formed of a hollow cylinder are supported by means of a plate 10A on suitable flat supporting surfaces on the right side of the flange 4 as clearly shown in FIG. 3 by suitable attaching means 10B. Centrifugal weight supporting arms 7 are pivotally mounted on suitable studs supported by bolts 20 on the left surface of the driving surface 6 as clearly shown in FIG. 1A and 4. Carried on the outer end of the pivoted arms 7 are centrifugally operated weights 7A and rotatably supported on such pivoted arm 7 are cam followers 8 and 9, the cam follower 9 being engagable with the cam surface 10 as clearly shown in FIGS. 1A and FIG. 5 while a cam follower 8 cooperates with a flat track surface 32 on the left surface of the drive disk 6 as shown in FIG. 1A the cam follower 9 being shown in engagement with the cam 10 in FIG. 2 and a small portion of the cam follower 8 projecting beyond the margin of the track plate 32 whereby when the shaft rotates with the flanges and the driving disc the centrifugal force applied to the arms 7 rotatable followers 8 and 9 and centrifugal weight 7A urges the arm 7 outwardly and thereby causes the roller 9 to move against the cam surface 10 thereby urging the movable flange 4 to the position shown in FIG. 1A causing the flanges to engage the driving belt 12 to cause the driving belt to move outwardly in accordance with the speed of the shaft 2 thereby obtaining the maximum efficiency with respect to the torque.

Stops 33 are provided on the left surface of the drive discs 6 to engage the arm 7 to prevent excessive movement of the arm 7 outwardly. Other stops 34 are provided to limit the inward movement of the centrifugal arms 7, the stops 33 and 34 thereby limiting the movement of the centrifugal arms.

From the above description it will be apparent that the present invention provides for automatic control of the belt 12 in accordance with the load applied and the torgue required for the various speeds to thereby obtain the maximum efficiency.

It will be apparent that the changes may be made within the scope of the invention as defined by the valid scope of the claims.

What is claimed is:

1. An automatic speed change of the V-belt drive type comprising a shaft, a fixed conical flange having a belt engaging surface for engagement with one edge of a V-belt, a movable conical flange slidably mounted on said shaft and having a belt engaging surface, the conical V-belt engaging surfaces diverging radially outwardly for engaging the opposite edge of the V-belt, a drive disk fixed on said shaft to rotate therewith, means providing for driving connection between said fixed and movable flanges and said drive disk during axial movement of said movable belt engaging flange, cam means on one of said movable flange and said drive disk, centrifugal weight supporting arm means pivoted on axes substantially parallel to said shaft for movement outwardly from said shaft on the other of said drive disk and movable flange, friction reducing roller cam follower means on said movable weight supporting means and cooperating with said cam means on said one of said movable flange and drive disk whereby the roller cam follower rolls on said cam substantially avoiding sliding and frictional forces when the rapid rotation of said shaft causes centrifugal force to move said centrifual weight supporting arm means outwardly urging said movable belt engaging flange into close relation to said fixed belt engaging flange whereby the effective diameter of said belt engaging flanges smoothly moves the V-belt outwardly on said speed control pulley.

2. The invention according to claim 1 in which a track is mounted on the other of said movable flange and drive disk, and a second roller follower is mounted on said pivoted arm adjacent said first roller follower in rolling relation to said track.

3. The invention according to claim 1 in which the cam is mounted on the movable flange.

4. The invention according to claim 3 in which the cam is a section of a cylinder.

5. The invention according to claim 1 in which stop means are provided to limit the inward and outward movement of the pivoted arm.

6. The invention according to claim 1 in which the hubs of the fixed flange and the movable flange are each provided with recesses on their adjacent surfaces and a compression spring is positioned surrounding the shaft and adapted to be compressed within the recesses when the flanges are in high speed operating position.

7. The invention according to claim 1 in which stop means are provided to prevent excessive movement of the pivoted arms and the flanges are provided with hub portions having spring receiving recesses and a compression spring is supported in such recesses to move said flanges away from one another in idling position.

8. The invention according to claim 7 in which the shaft is provided with a tapered bore for attachment to the tapered end of a drive shaft and means are provided for retaining the shaft of the automatic speed changes drive on the drive shaft in driving relation.

9. The invention according to claim 1 in which the fixed and movable flanges are provided with recesses in their hub portions facing one another and a compression spring is mounted therein, the cam having a continuous slope so that the spring normally urges the pivoted arms inwardly and stop means are provided to limit the outward movement.

* * * * *